United States Patent [19]

Sutton, Jr.

[11] 4,428,278
[45] Jan. 31, 1984

[54] EMERGENCY VENTILATION CONTROL APPARATUS FOR ANIMAL CONFINEMENT HOUSE

[76] Inventor: James A. Sutton, Jr., 816 Henkel Rd., Statesville, N.C. 28677

[21] Appl. No.: 296,570

[22] Filed: Aug. 26, 1981

[51] Int. Cl.³ .............................................. F24F 13/08
[52] U.S. Cl. ...................... 98/33 R; 49/30; 49/31; 119/21; 160/9; 254/375
[58] Field of Search .............. 49/2, 31, 30; 98/32, 98/33 R, 1; 119/21; 160/6, 9; 236/49; 335/273, 276; 254/375

[56] References Cited

U.S. PATENT DOCUMENTS

| | | | |
|---|---|---|---|
| 1,684,929 | 9/1928 | Snavely | 335/276 |
| 2,636,933 | 4/1953 | Lecher | 335/276 X |
| 3,973,173 | 8/1976 | Smith | 160/6 X |
| 4,113,175 | 9/1978 | Sutton, Jr. | 98/33 R X |

FOREIGN PATENT DOCUMENTS 1057063  2/1967  United Kingdom .................... 49/30
1432553  4/1976  United Kingdom .................... 49/2

*Primary Examiner*—Edward G. Favors
*Assistant Examiner*—Harold Joyce
*Attorney, Agent, or Firm*—W. Thad Adams, III

[57] ABSTRACT

An apparatus responsive to electric power failure for opening curtains or doors normally covering ventilation openings in a confinement house of the type used for raising poultry and livestock is disclosed. An electromagnet (59) is provided which is energized by the electric power supply (41) to the house (10) and is de-energized upon failure of the electric power supply (41). A pivoted metal strip (61) is normally in contact with the magnet (59) and is interconnected by means of a cord (66) with the winch (25) which is used to raise and lower the curtains (16). When the electric power (41) fails and the electromagnet (59) is de-energized, the cord (66) releases, and allows the curtains (16) to fall under their own weight. A capacitor (78) prevents de-energization of the magnet (59) when momentary power failures occur.

3 Claims, 7 Drawing Figures

EMERGENCY VENTILATION CONTROL APPARATUS FOR ANIMAL CONFINEMENT HOUSE

TECHNICAL FIELD AND BACKGROUND OF THE INVENTION

This invention relates to an improved apparatus for providing emergency ventilation to animals, such as poultry or livestock, which are confined in houses specifically designed to enclose the animals while they are fed and allowed to grow to marketable size. Some houses are totally enclosed with some access doors on the sides and on the ends. Electric ventilating fans provide fresh air with oxygen and maintain desired temperatures. Most houses have large open windows on at least two sides and are covered with screen wire. Normally these screened areas are covered with window covers or curtains and are opened only when necessary to provide adequate ventilation for the animals. Under usual circumstances, some electric ventilating fans are used to exhaust air thereby supplying the fresh air with oxygen necessary for good health. Other fans maintain temperatures within required ranges. Under other circumstances electric winches open and close the curtains to supply fresh air and maintain the temperature.

Many animals, especially poultry, have very high metabolic rates, causing the animals to generate large quantities of body heat which must be dissipated constantly. In addition, poultry exhale relatively large amounts of carbon dioxide. When large numbers of birds are confined within a single enclosure, carbon dioxide, being heavier than air, very quickly settles in a layer near the floor. Unless the carbon dioxide is constantly removed, the layer can reach a height sufficient to suffocate the poultry within the house by preventing them from receiving enough oxygen. For this reason, a power failure in the electric ventilation fans or electric curtain winders must be promptly detected and alternate ventilation provided.

Several prior patents disclose various types of methods and devices for automatically lowering the curtains from the ventilation openings present in most confinement houses. For example, U.S. Pat. No. 3,915,377 to the present applicant discloses a device which, upon the occurrence of a power failure, activates a circuit containing a battery which heats a nichrome wire. A nylon cord extends from the apparatus which holds the curtains in a raised position and passes closely adjacent the nichrome wire which burns through the cord, releases the curtains and allows them to drop, thus providing emergency ventilation. Of course, this type of system relies on the proper maintenance and functioning of the backup device so that it operates when a power failure occurs.

A similar device is disclosed in U.S. Pat. No. 3,973,173 to Smith. Smith discloses the use of a capacitor which, after a pre-determined delay, drains current to a solenoid, which retracts a plunger and releases a latching cable connected to the ratchet handle of a winch by which the curtains are maintained in a raised position over the ventilation openings. As with the earlier-described patent, the backup system must be properly maintained and functioning in order to open the curtains and provide ventilation.

The Milroy U.S. Pat. No. 4,056,048 discloses a device which opens a plurality of louvered shutters which are normally held closed by means of electric motors when electric power is available. When a power failure occurs, a spring on each set of louvers causes the louvers to move to an open position.

The invention described below solves many of the problems encountered in connection with the above-described devices by providing a system which releases ventilation curtains or doors upon the occurrence of a power failure without the necessity of secondary means which must properly function in the presence of the power failure.

SUMMARY OF THE INVENTION

Therefore, it is an object of the invention to provide an improved apparatus which is responsive to an electric power failure and opens curtains, doors or windows normally covering ventilation openings in a confinement house of the type used for raising poultry and livestock.

It is another object of the present invention to provide a simple and inexpensive device which does not rely upon self-contained power or current to effect the release of the curtains.

These and other objects and advantages of the present invention are achieved in the preferred embodiment of the apparatus described below by providing an apparatus responsive to electric power failure for opening curtains or doors which normally cover ventilation openings in a confinement house of the type used for raising poultry and livestock. These houses are typically provided with an electric power supply with a power ventilation system. The apparatus preferably comprises magnetic means which is energized by the electric supply means and de-energized upon failure of the electric power supply means. Means are provided for operably connecting the magnetic means to the curtains or doors for holding the curtains or doors in a closed position when the magnetic means is energized and opening the curtains or doors upon de-energization of the magnetic means.

The apparatus preferably includes means operably connected to the magnetic means for delaying the opening of the curtains or doors for a pre-determined period of time after an electric power failure. This prevents opening of the curtains in response to a power failure which is only momentary.

BRIEF DESCRIPTION OF THE DRAWINGS

Some of the objects of the invention have been set forth above. Other objects and advantages of the invention will appear as the description of the invention proceeds, when taken in conjunction with the following drawings, in which.

DESCRIPTION OF THE PREFERRED EMBODIMENT

Figure 1:
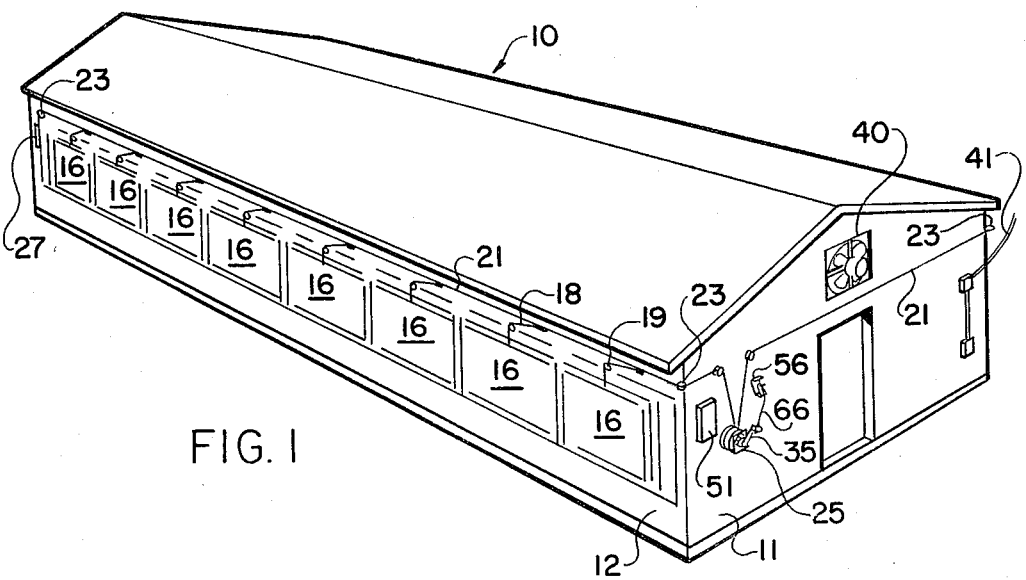
FIG. 1 is a perspective view of a poultry house of a conventional type showing ventilation openings extending longitudinally along the length of the house with curtains covering the ventilation openings, the winch and cables which permit the curtains to be raised and lowered, and the curtain control apparatus according to the present invention.
Figure 2:
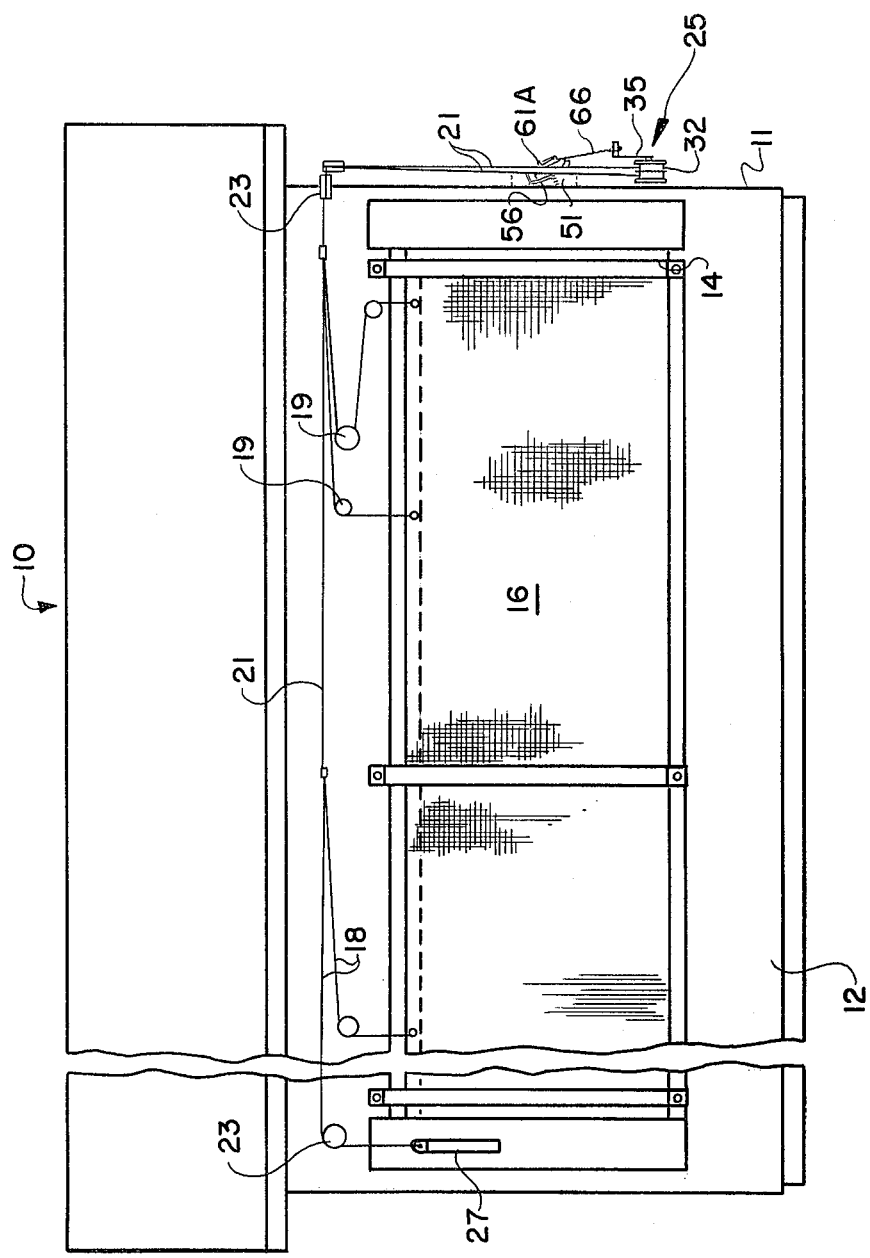
FIG. 2 is an enlarged partial side elevational view of a poultry house showing the curtains in their raised position over the ventilation openings, the winch and cable system used to raise and lower the curtains, and the curtain control apparatus.

Referring now specifically to the drawings, an animal enclosure, such as a poultry house, is shown in FIGS. 1 and 2 and indicated at reference numeral 10. The house 10 includes a relatively short end wall 11 and a relatively long side wall 12. Side wall 12 and the other side wall (not shown) are provided with ventilation openings 14 which extend substantially their entire length. The curtains 16 can be fabricated of any suitable flexible material and are normally secured to side wall 12 immediately below ventilation openings 14. Curtain cords 18 are suitably attached to the upper edge of the curtains 16 and are used to raise the curtains 16 to cover ventilation openings 14. Each of the curtain cords 18 pass around a suitably positioned pulley 19 and are secured at their other end to a cable 21 which extends the length of the side wall 12. Cable 21 is maintained in its longitudinally extending position by means of two pulleys 23, one positioned at each end of the side wall 12.

A winch 25 is suitably positioned on end wall 11 and is used for reeling the cable 21 in or out, as desired. As is shown in FIG. 1, the winch 25 can be used to reel in the cable 21 from both sides 12 of the enclosure 10. A weight 27 is secured to the cable 21 on the end curtains 16 when winch 25 is being unreeled.

As is apparent from the foregoing, the curtains 16 will fall from the ventilation openings 14 under their own weight and the weight of the cable 27 when the cable 21 is allowed to unreel from the winch 25.

Figure 4:
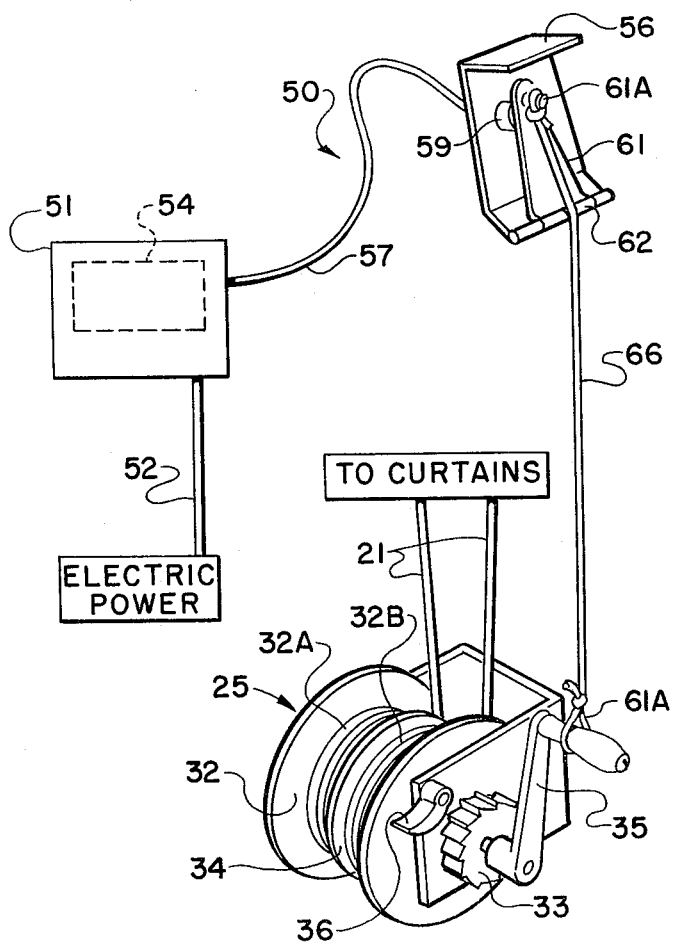
FIG. 4 is a fragmentary perspective view of the winch mechanism and the curtain control apparatus according to the present invention.

As is shown in FIG. 4, winch 25 includes a drum 32 which is divided into two sections, 32a and 32b, by means of an enlarged diameter ring 34 positioned in the middle of the drum. Drum section 32a winds the cable 21 from one side of the house and drum section 32b winds the cable 21 from the other. The winch 25 is operated by means of a winch crank 35 which turns drum 32 through a conventional gearing device. Winch 25 also includes a lock 36 which, when in position, engages a ratchet 33 and prevents drum 32 from unwinding cable 21. Alternatively separate winches 25 can be used to control curtains 16 on each side of the house.

Referring again to FIG. 1, an electrically operated ventilation fan 40 is shown positioned on the end of house 10. The fan 40 is supplied electric current by an electric power supply 41 and normally operates to continuously circulate fresh air through the interior of house 10, either by openings on the opposite end of the house or in conjunction with another fan (not shown) on the other end of the house.

Figure 6:
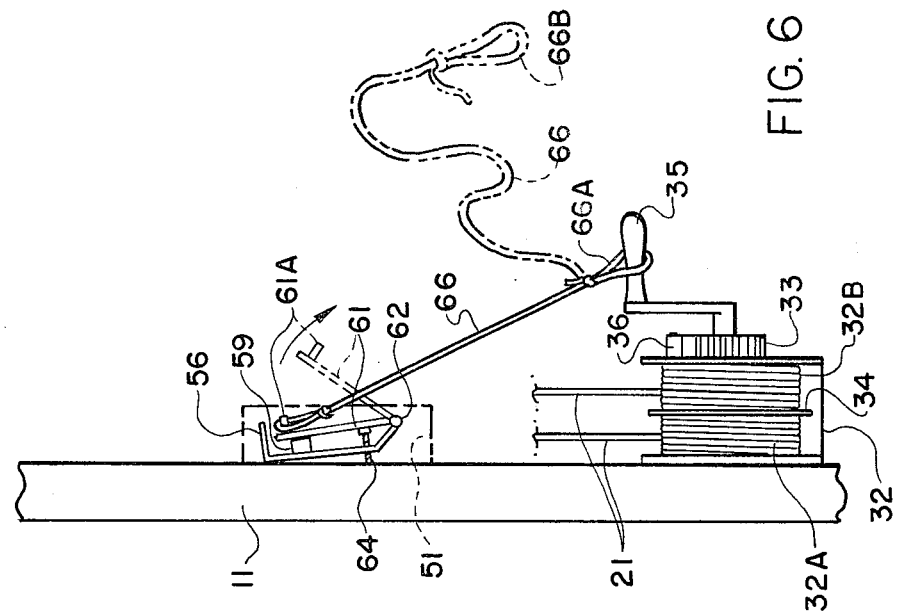
FIG. 6 is an enlarged, side elevational view of the winch mechanism and the curtain control apparatus, as is shown in FIG. 2.
Figure 5:
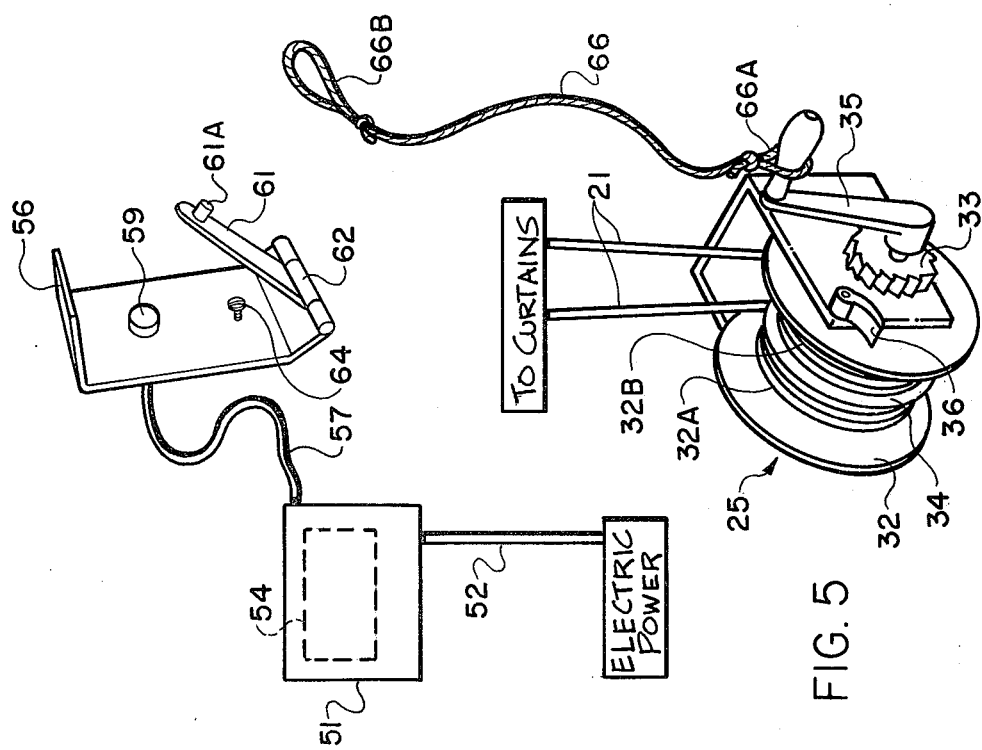
FIG. 5 is a fragmentary perspective view similar to FIG. 3 and showing the curtain control apparatus during releasement of the curtains.

FIG. 4 illustrates the curtain control apparatus according to the present invention as illustrated at broad reference numeral 50. The apparatus comprises a control box 51 which is supplied electric power from the electric power supply 41 by means of an electric conduit 52. The control box contains appropriate electrical circuitry 54, which is described in detail below. A magnet housing 56 is electrically interconnected with the control box 51 by means of an electrical conduit 57. As is best shown in FIGS. 5 and 6, an electromagnet 59 is positioned on the front, outwardly facing surface of the magnet housing 56. An elongate member, comprising a magnetic metal strip 61 is pivotally mounted by means of a hinge 62 directly below magnet 59. An outwardly projecting stop pin 61a is mounted on strip 61. As is illustrated in FIG. 5, the magnet housing 56 is positioned on and at an acute angle to the vertical end wall 11. This acute angle is maintained by means of an adjustable threaded bolt 64 which passes through the backside of magnet housing 56 and impinges directly upon side wall 11. By turning the adjustable bolt 64 one way or the other the angle of the magnet housing 59 relative to end wall 11 can be adjusted as desired.

Stop means, including a cord 66 with a loop 66a on one end and a loop 66b on the other end, is positioned in a tensioned condition between the crank handle 35 and the stop pin 61a. The magnet housing 59, and particularly the hinge 62 interrupts and diverts the straight line passage of cord 66 from the winch crank 35 to the stop pin 61a. The impingement by hinge 52 on cord 66 translates what would be outward pull on the metal strip 61 away from magnet 59 to downward pull, giving magnet 69 a mechanical advantage and substantially decreasing the amount of electromagnetic force required to maintain the strip 61 against the magnet 59 and thereby prevent the weight transmitted by the winch crank 35 from pulling metal strip 61 away from magnet 59. As long as electric power is being supplied through control box 51 to magnet 59, the metal strip 61 is held in place against magnet 59 and stop pin 61a holds cord 66 in a tensioned condition, preventing the winch crank 35 from moving. When electric power to magnet 59 is interrupted, the downward force exerted by cord 66 pulls metal strip 61 away from magnet 59. As the metal strip 61 pivots, cord loop 66b is pulled off of stop pin 61a and the winch crank 35 is released. The weight of the curtains 16 and cable weight 27 cause the winch crank 35 to unwind, releasing curtains 16 from their raised position over the ventilation openings 14, thereby supplying emergency ventilation. Note that when the curtain control apparatus is in its ready condition as illustrated in FIGS. 4 and 6, the winch lock 36 is in a disengaged position so that the winch crank 35 can freely turn upon releasement of the cord 66.

Figure 7:
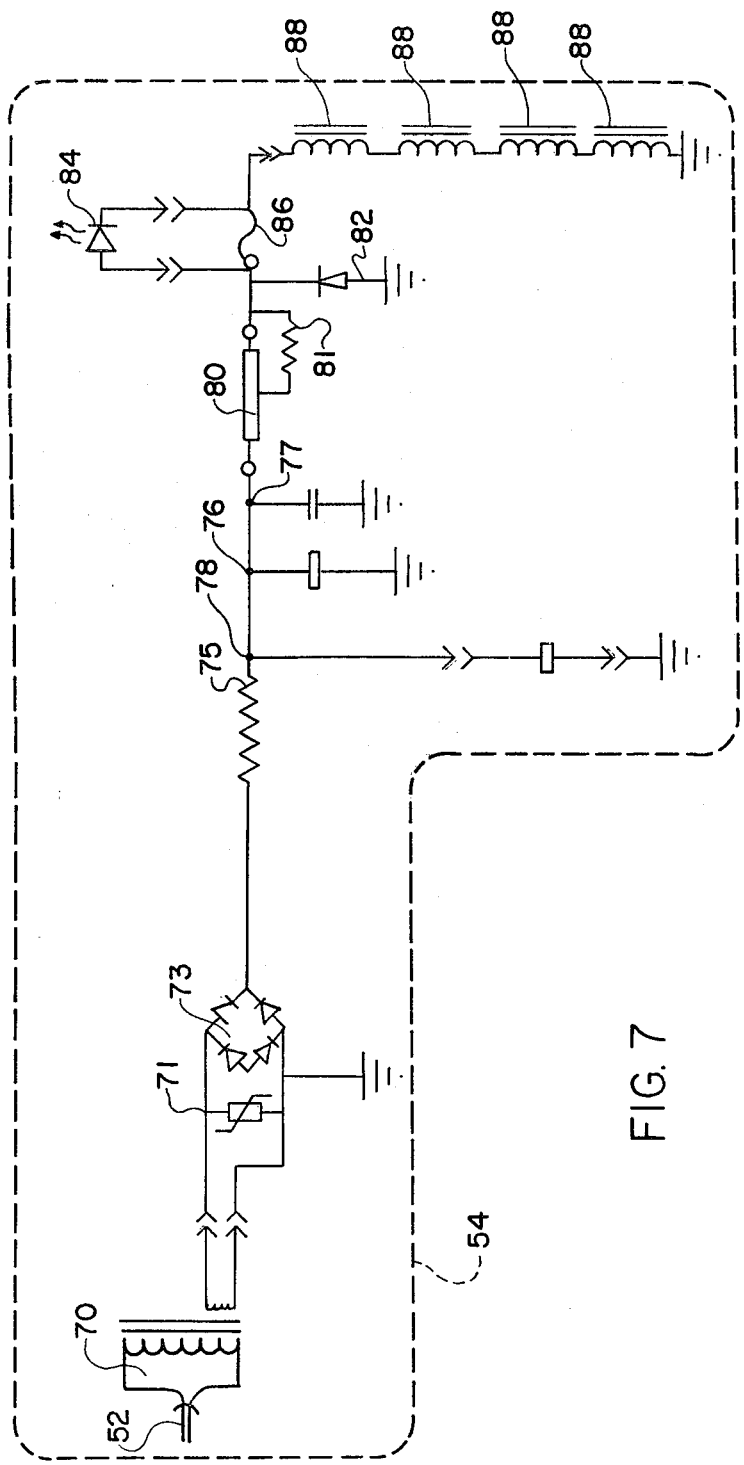
FIG. 7 is a schematic diagram of the electrical system of the curtain control apparatus.

FIG. 7 is a schematic diagram of a suitable electronic circuitry 54 which performs the functions set forth below and, in addition, provies a delay in interruption of electric current to magnet 59 so that curtains 16 are not released during a momentary power failure. The power supply to circuitry 54 is usually that which is supplied to ventilation fan 40. Most of these large size, high capacity fans operate on 230 volts. However, in other instances circuitry 54 may be plugged into 115 volt service. In either case, a step-down transformer 70 is used to drop the incoming voltage down to between 20 and 30 volts AC. A metal oxide varistor (mov) 71 is placed across the output of transformer 70 to protect circuit 54 from lightning and transient damage. The output from transformer 70 feeds a bridge rectifier 73 which converts the incoming AC current to DC current. The DC current passes through a resistor 75 which smoothes the DC current and limits the current passing through bridge rectifier 73. The direct current is filtered by capacitors 76 and 77. A relatively large capacity capacitor 78 holds a large amount of DC current so that in the event of a loss of AC current at the transformer 70, capacitor 78 will feed direct current through the circuitry to magnet 59 for approximately 30 seconds. Of course, by changing the capacity of the capacitor 78 the time delay can be varied to increase or decrease the amount of time current will be fed by the capacitor 78 to the magnet 59.

Direct current from resistor 75 or capacitor 78 is fed to a current regulator 80. Current regulator 80 is provided to maintain a constant current power supply so that when capacitor 78 is feeding current to magnet 59, the discharged will be sufficiently slow to provide the desired delay in interruption of current to the magnet 59. The current regulator 80 also permits as many as four magnets 59 to be wired in series, if desired, without any loss of magnetism. The amount of current that current regulator 80 meters and delivers to the magnet 59 is determined by the size of a resistor 81. A diode 82 is included to prevent damage to current regulator 80.

A light emitting diode (LED) 84 can be included in the circuit if visual means of indicating that current is being supplied to the magnet 59 is required. If LED 84 is not included, then a fuse 86 is placed in the circuit to prevent a power supply overload. Direct current is then provided to a magnetic coil 88 which directly connects with magnet 59. As is shown in FIG. 7, a plurality of magnetic coils 88 can be powered in series through the same circuit 54 so that a number of different sets of curtains can be controlled.

The following list illustrates one of many suitable combinations of components described above:

Transformer 70—220-115/18 VAC plug-in type
Metal Oxide Varister 71—GE MOV MA3A GEF1
Diode 73—A14F
Resistor 75—1 ohm 5% 5 watt
Capacitor 76—2,200 microfarad 35 v (electrolytic)
Capacitor 77—0.01 microfarad (ceramic)
Capacitor 78 41,000 microfarad 64 v surge 50 v (electrolytic)
Current Regulator 80—LM317T
Resistor 81—15 ohm 5% 0.25 watt
Diode 82—IN4001
Fuse 86—3 amp To reset the apparatus after electric current has been restored, metal strip 61 is pivoted into direct physical contact with magnet 59. Loop 66a of cord 66 is placed over winch crank 35 after the curtains have been raised to their upward position over ventilation openings 14. Loop 66b on the other end of cord 66 is placed over stop pin 61a. Care must be taken to ensure that winch lock 36 is disengaged so that winch crank 35 will freely unwind upon the occurrence of another power failure.

The ventilation control apparatus according to the present invention is shown installed on a conventional enclosure house 10 (FIG. 1). In this particular embodiment, control box 51 is placed in close proximity to magnet housing 56. However, it is apparent from the foregoing that the control box 51 can be placed in a location remote from magnet housing 56 such as inside the house 10 or even in another building. Situations may arise where it is expedient to monitor the temperature within the house in addition to monitoring the availability of electric power to ventilation fan 40. For example, if fan 40 should malfunction in the presence of electric current or if outside temperatures should be so high that the fan 40 is unable to maintain the temperature in the house at a sufficiently low setting, a conventional thermostat can be wired into circuit 54, preferably at the terminals to magnet 59.

Figure 3:
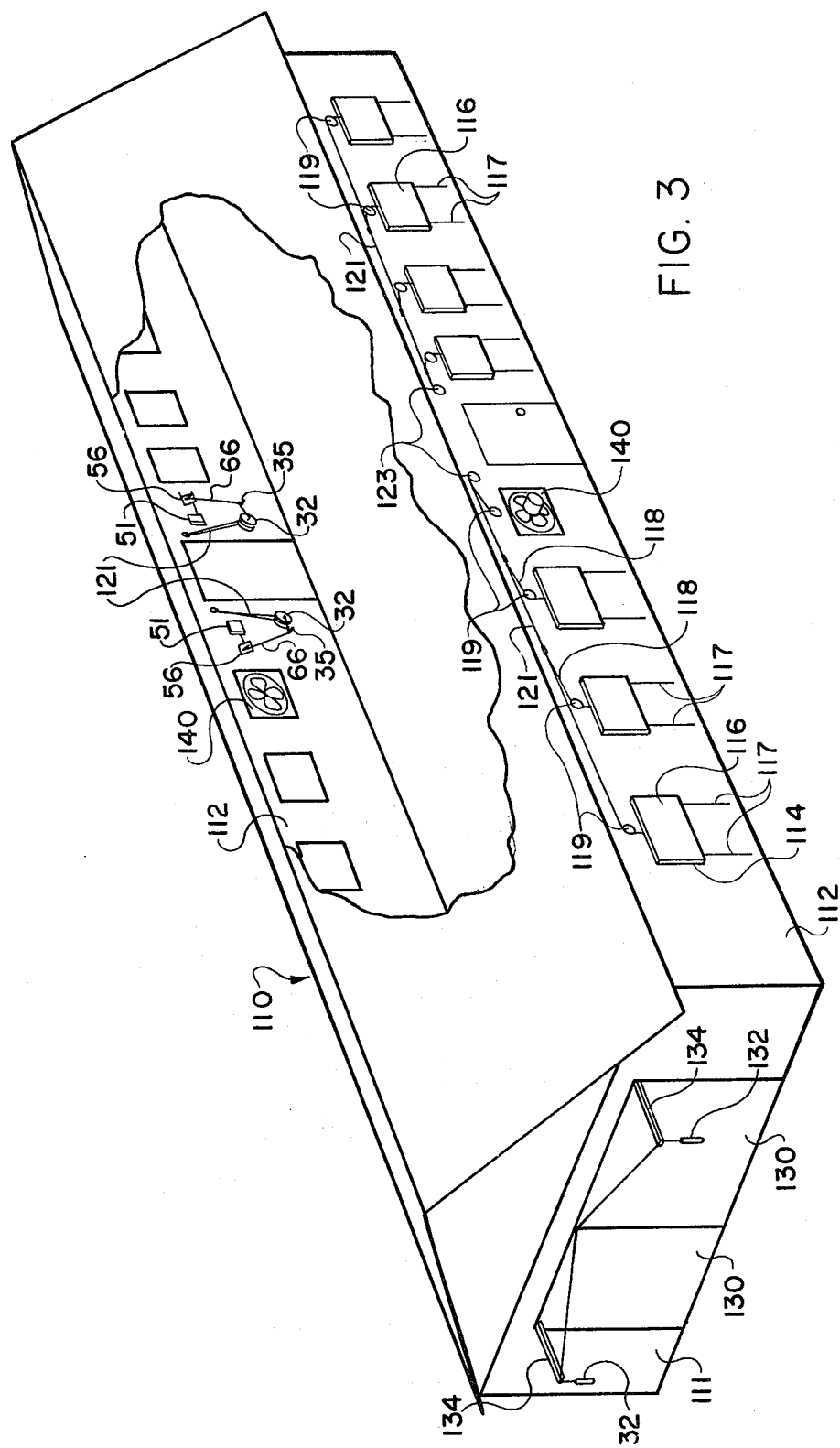
FIG. 3 is a perspective view, with parts broken away, showing a poultry house of another design.

FIG. 3 illustrates the same system described above in use on a poultry confinement house 110 of a different design. House 110 has end walls 111 and side walls 112. On each side wall 112 are provided a plurality of longitudinally spaced-apart ventilation windows 114 which are normally covered by window covers 116. Window covers 116 are held in place over windows 114 by window cords 118 which are each connected to a winch cable 121, as described above, and move over pulleys 119. Cable pulley 123 carries winch cable 121 to a winch 125. Since winch 125 controls only part of one side of house 110, a split drum is not necessary. Otherwise the operation of the apparatus according to the present invention is the same as described above with reference to FIGS. 1 and 2, and operates when, for example, ventilation fans 140 malfunction or lose electric power, to allow window covers 116 to slide down along tracks 117 from windows 114.

Still referring to house 110, a large door 130 on end wall 111 is shown. Door 130 can also be controlled by the apparatus according to the present invention by securing one end of cord 66 to the inside of the door 130 instead of to winch crank 35. Upon electric power failure cord 66 is released and door 130 is pulled upon by a weight 132 suspended from a boom 134. Weight 134 is attached to a rope 136, the other end of which is secured to door 130, as is shown in FIG. 3. With door 130 open, additional ventilation is provided until electric power can be restored.

Contrary to the known prior art, the apparatus according to the present invention utilizes electric power being supplied to conventional ventilation fans to hold curtain windows in their raised position. If, for any reason, the magnet is deprived of electric current, the curtains or windows are released. This is true whether an interruption of electric power to the ventilating fan occurs or because of any type of malfunction of the circuitry. By contrast, the circuitry of known prior art devices must properly operate in the absence of electric current. If the circuitry malfunctions or the auxiliary power supplies (such as capacitors or batteries) fail to work the curtains are not lowered and the device has not performed its intended function.

An apparatus responsive to electric power failure for opening curtains, doors and windows normally covering ventilation openings in a confinement house is described above. Various details of the invention may be changed without departing from its scope. Furthermore, the foregoing description of a preferred embodiment of the apparatus according to the present invention is provided for the purpose of illustration only and not for the purpose of limitation—the invention being defined by the claims.

I claim:

1. An emergency ventilation control apparatus responsive to electric power failure for opening covers normally covering ventilation openings in a confinement house of the type used for raising poultry and livestock, said covers adapted for being adjustably positioned between a raised position covering said ventilation openings and a lowered position with said ventilation openings uncovered, said confinement house having electric power supply means and power ventilation means operably connected to said electric supply means, said apparatus comprising:

(a) a magnet energized by said electric power supply means and de-energized upon failure of said electric power supply means;
(b) cable means operably connected to said covers and adapted for raising said covers from a lowered position to a raised position;
(c) a winch, including a winch crank, cooperating with said cable means for raising said covers from a lowered to a raised position and for maintaining said covers in a raised position;
(d) a strand, one end of said strand cooperating with said winch crank;
(e) an elongate member pivotally mounted in spaced-apart relation to said magnet and having a portion thereof comprised of a magnetically attractable material for being magnetically engaged to said magnet and including means for releasably carrying the end of said strand remote from the end carried by said winch crank and being positioned intermediate said winch crank and said magnet in such position that upon de-energization of said magnet, said elongate member pivots, thereby releasing said strand and permitting said winch to lower said covers, said pivotally mounted elongate member being positioned intermediate said winch crank and said magnet in an overcenter position and impinging upon said strand thereby providing a mechanical advantage to said magnet in maintaining said covers in a raised position;
(f) means operably connected to said magnet for delaying the opening of said covers for a pre-determined period of time after an electric power failure to prevent lowering of said covers in response to a power failure which is only momentary.

2. An emergency ventilation apparatus responsive to electric power failure for opening covers normally covering ventilation openings in a confinement house of the type used for raising poultry and livestock, said covers adapted for being adjustably positioned between a raised position covering said ventilation openings and a lowered position with said ventilation openings uncovered, said confinement house having electric power supply means and power ventilation means operably connected to said electric supply means, said apparatus comprising:

(a) a magnet energized by said electric power supply means and de-energized upon failure of said electric power supply means;
(b) a winch, winch crank and cable operably connected to said covers and adapted for raising said covers from a lowered position to a raised position;
(c) a strand releasably interconnecting said magnet and said winch crank;
(d) an elongate member pivotally mounted intermediate said winch crank and said magnet in an overcenter position impinging upon said strand thereby providing a mechanical advantage to said magnet, said elongate member having a portion thereof comprised of a magnetically attractable material for being magnetically engaged to said magnet and including means for releasably carrying the end of said strand remote from the end carried by said winch crank and being positioned intermediate said winch crank and said magnet in such position that upon de-energization of said magnet, said elongate member pivots, thereby releasing said strand and permitting said winch to lower said covers.

3. An apparatus according to claim 2 and including adjustment means for permitting the degree of impingement upon said strand to be adjusted, thereby varying the overcenter position and the amount of mechanical advantage provided to said magnet.

* * * * *